(12) United States Patent
Zhang et al.

(10) Patent No.: US 11,640,503 B2
(45) Date of Patent: May 2, 2023

(54) INPUT METHOD, INPUT DEVICE AND APPARATUS FOR INPUT

(71) Applicant: BEIJING SOGOU TECHNOLOGY DEVELOPMENT CO., LTD., Beijing (CN)

(72) Inventors: Yang Zhang, Beijing (CN); Haofeng Jiao, Beijing (CN); Yanli E, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 343 days.

(21) Appl. No.: 16/340,252

(22) PCT Filed: Nov. 30, 2016

(86) PCT No.: PCT/CN2016/107989
§ 371 (c)(1),
(2) Date: Apr. 8, 2019

(87) PCT Pub. No.: WO2018/076450
PCT Pub. Date: May 3, 2018

(65) Prior Publication Data
US 2019/0340233 A1    Nov. 7, 2019

(30) Foreign Application Priority Data

Oct. 31, 2016    (CN) .......................... 201610932804.4

(51) Int. Cl.
*G06F 40/274* (2020.01)
*G06F 3/023* (2006.01)
(Continued)

(52) U.S. Cl.
CPC .......... *G06F 40/274* (2020.01); *G06F 3/0233* (2013.01); *G06F 40/284* (2020.01); *G06F 40/44* (2020.01)

(58) Field of Classification Search
CPC ...... G06F 40/274; G06F 40/44; G06F 40/284; G06F 3/0233; G06F 40/30;
(Continued)

(56) References Cited

U.S. PATENT DOCUMENTS 5,119,296 A    6/1992    Zheng et al.
6,070,160 A *  5/2000    Geary ................. G06F 16/2468
                                                      707/999.005

(Continued)

FOREIGN PATENT DOCUMENTS

CN    1141452 A    1/1997
CN    1442780 A    9/2003
(Continued)

OTHER PUBLICATIONS

China National Intellectual Property Administration (CNIPA), Office Action 1 for 20161093280.4, dated Aug. 26, 2020, 23 pages (including translation).
(Continued)

*Primary Examiner* — Abdelali Serrou
(74) *Attorney, Agent, or Firm* — Anova Law Group, PLLC

(57) ABSTRACT

An input method, an input device, and an apparatus for input are provided in the embodiments of the present application. The method specifically includes: receiving an input string having a fast input intent, wherein the fast input intent is used to indicate, according to a shorthand information of a word or a phrase corresponding to the input string, the word or the phrase; obtaining word candidates and/or phrase candidates corresponding to the input string according to a
(Continued)

language model, wherein the word candidates and the phrase candidates are respectively complete words and complete phrases corresponding to the input string; presenting word candidates and/or phrase candidates to a user. The embodiments of the present application can not only improve the flexibility and application range of the fast input, but also improve the quality of word candidates and/or phrase candidates, thereby improving input efficiency.

15 Claims, 5 Drawing Sheets

(51) Int. Cl.
  *G06F 40/44* (2020.01)
  *G06F 40/284* (2020.01)
(58) Field of Classification Search
  CPC ............ G06F 3/04883; G06F 3/03547; G06F 3/04886; G06F 3/0237
  See application file for complete search history.

(56) References Cited

U.S. PATENT DOCUMENTS

| | | | |
|---|---|---|---|
| 7,962,848 B2* | 6/2011 | Bertram | H04L 41/22 715/261 |
| 8,116,569 B2* | 2/2012 | Markiewicz | G06F 3/04883 382/186 |
| 8,122,022 B1* | 2/2012 | Baker | G06F 16/313 707/758 |
| 8,756,052 B2* | 6/2014 | Walker | G06F 40/274 704/9 |
| 8,965,754 B2* | 2/2015 | Jones | G06F 40/274 704/10 |
| 9,323,808 B1* | 4/2016 | Kanefsky | G06F 16/9574 |
| 9,355,084 B2* | 5/2016 | Doornenbal | G06F 40/169 |
| 9,760,559 B2* | 9/2017 | Dolfing | G06F 40/274 |
| 10,067,574 B2* | 9/2018 | Molla | G06F 3/018 |
| 2001/0040517 A1 | 11/2001 | Kisaichi et al. | |
| 2006/0230350 A1* | 10/2006 | Baluja | G06F 40/274 715/700 |
| 2006/0241944 A1 | 10/2006 | Potter et al. | |
| 2006/0290535 A1* | 12/2006 | Thiesson | G06F 40/274 341/22 |
| 2006/0294462 A1* | 12/2006 | Blair | G06F 3/0237 715/201 |
| 2007/0076862 A1* | 4/2007 | Chatterjee | G06F 40/274 379/433.06 |
| 2007/0110222 A1* | 5/2007 | Kim | G06F 3/0237 379/355.07 |
| 2010/0153881 A1* | 6/2010 | Dinn | G06F 3/0237 715/825 |
| 2010/0292050 A1* | 11/2010 | DiBenedetto | G08B 3/1016 482/9 |
| 2011/0004849 A1* | 1/2011 | Oh | G06F 3/0237 715/816 |
| 2011/0234524 A1* | 9/2011 | Longe | G06F 3/0238 345/173 |
| 2012/0050188 A1* | 3/2012 | Andersson | G06F 1/1626 345/173 |
| 2013/0290894 A1* | 10/2013 | Aides | G06F 3/0237 715/773 |
| 2013/0325884 A1* | 12/2013 | Soel | G06F 40/194 707/E17.058 |
| 2014/0067371 A1* | 3/2014 | Liensberger | G06F 3/0237 704/9 |
| 2014/0278367 A1* | 9/2014 | Markman | G06F 40/253 704/9 |
| 2014/0303960 A1* | 10/2014 | Orsini | H04L 51/04 704/2 |
| 2014/0303961 A1* | 10/2014 | Leydon | G06F 40/51 704/2 |
| 2014/0337989 A1* | 11/2014 | Orsini | H04L 51/12 726/26 |
| 2016/0328147 A1 | 11/2016 | Zhang et al. | |
| 2017/0052936 A1* | 2/2017 | Paradis | G06F 40/157 |

FOREIGN PATENT DOCUMENTS

| | | |
|---|---|---|
| CN | 1470977 A | 1/2004 |
| CN | 1869892 A | 11/2006 |
| CN | 101371253 A | 2/2009 |
| CN | 101539808 A | 9/2009 |
| CN | 101546226 A | 9/2009 |
| CN | 104007832 A | 8/2014 |

OTHER PUBLICATIONS

China National Intellectual Property Administration (CNIPA), Office Action 4 for 201610932804.4, dated Oct. 27, 2021, 17 pages (including translation).
Indian Patent Office, Examination report for Application No. 202147022430, dated Dec. 3, 2021, 7 pages.
Dajun Dong, "Computer Application Fundamentals," People's Health Publishing House, first edition, Jul. 31, 1999, p. 51. 4 pages.
The World Intellectual Property Organization (WIPO), International Search Report for PCT/CN2016/107989, dated Jul. 27, 2017, 6 Pages (including translation).
Lianjun Guan, "Design and Application of Intelligent Fault Tolerance English Input Engine", Electronic Technology & Information Science, China Master's Theses Full-Text Database, No. 10, Oct. 15, 2012 (Oct. 15, 2012), ISSN: 1674-0246, p. 38, line 1 to p. 56, line 1.
Lianjun Guan et al., "An Intelligent Pre-Prompt English Language Input Engine Supporting Multiple Fuzzy Match Processing", Journal of Chengdu University of Information Technology, 27(2), Apr. 30, 2012 (Apr. 30, 2012), ISSN 1671-1742, p. 132, line 1 to p. 135, line 1.

* cited by examiner

US 11,640,503 B2

INPUT METHOD, INPUT DEVICE AND APPARATUS FOR INPUT

CROSS-REFERENCE TO RELATED APPLICATIONS

This application is a national phase entry under 35 U.S.C. § 371 of International Application No. PCT/CN2016/107989, filed on Nov. 30, 2016, which claims priority to Chinese Patent Application No. 201610932804.4, filed with the Chinese Patent Office on Oct. 31, 2016 and entitled "AN INPUT METHOD, AN INPUT DEVICE, AND AN APPARATUS FOR INPUT", the entire contents of both of which are hereby incorporated by reference.

FIELD OF TECHNOLOGY

The present disclosure generally relates to the field of information input technologies and, more particularly, relates to an input method, an input device and an apparatus for input.

BACKGROUND

An input method refers to an encoding method adopted to input various characters into a smart terminal such as a smartphone or a desktop computer. At present, keystroke rate is an important indicator to measure the performance of the input method. The keystroke rate is the number of keystrokes required to input N characters on average. Generally, the smaller the number of keystrokes, the higher the keystroke rate and corresponding input efficiency. Improved input efficiency enable users in English, Italian, Portuguese, Malaysian and the like to interact with intelligent terminals through input method programs.

When inputting English words, most general input method programs adopt a prefix matching strategy to realize the fast input of English words, so that a user can input the English words with as few keystrokes as possible. English words can be recorded in the dictionary in advance. After receiving the user's input string, the input string is matched with the front part of the English word in the dictionary, and the English words matched successfully are used as candidates. For example, if the user wants to input "before", when inputting the input string of "be", the input method searches for English words beginning with "be" in the dictionary to get "before", "befall", "beguile", "beneath" and the like as candidates, so that the user can input the English word to be entered on the screen without typing the complete string.

In the process of implementing the present application, the inventors found that the prefix matching strategy requires the user to accurately memorize the front part of the English word, which not only challenges the user's memory, but also fails to realize rapid input of the English word when the user fails to memorize the front part of the English word. In this case, the user needs to obtain the front part or the complete character string of the English word by looking up references and the like, thus affecting the input efficiency of the English word.

Moreover, if the input string belongs to a prefix of a plurality of English words, the input method program returns more candidates. The user needs to find the English word after a plurality of page turning operations and the like. The plurality of page turning operations makes the user's operation and time cost high, resulting in low input efficiency.

BRIEF SUMMARY OF THE DISCLOSURE

In view of the above problems, embodiments of the present application are proposed in order to provide an input method, an input device, and an apparatus for input that overcome the above problems or at least partially solve the above problems. The embodiments of the present application can improve the flexibility and application range of fast input, as well as improve the quality of word candidates and/or phrase candidates, thereby improving the input efficiency.

In order to solve the above problems, the present application discloses an input method, which includes: receiving an input string having a fast input intent, wherein the fast input intent is used to indicate, according to a shorthand information of a word or a phrase corresponding to the input string, the word or the phrase; acquiring word candidates and/or phrase candidates corresponding to the input string according to a language model, wherein the word candidates and the phrase candidates are respectively complete words and complete phrases corresponding to the input string; and presenting the word candidates and/or the phrase candidates to a user.

In another aspect, the present application discloses an input device, which includes: an input string receiving module for receiving an input string having a fast input intent, the fast input intent being used to indicate, according to a shorthand information of a word or a phrase corresponding to the input string, the word or the phrase; a candidate acquisition module for acquiring word candidates and/or phrase candidates corresponding to the input string according to a language model, wherein the word candidates and the phrase candidates are respectively complete words and complete phrases corresponding to the input string; and a candidate presentation module for presenting the word candidates and/or the phrase candidates to a user.

Optionally, the candidate acquisition module includes: a first determination submodule for determining the complete words that conform to the fast input intent corresponding to the input string; a first model processing submodule for inputting the complete words and context data corresponding to the input string to the language model, and outputting probabilities of corresponding combinations of the complete words and the context data by using the language model; and a first selection submodule for selecting the word candidate corresponding to the input string from the complete words according to the probabilities of the combinations.

Optionally, the first determination submodule includes: a first determination unit for, identifying a complete word partly formed by the input string or an error correction string corresponding to the input string as one of the complete words corresponding to the input string having the fast input intent; or a second determination unit for mapping characters in the input string to corresponding alphabet characters according to pronunciation, to obtain one of the complete words corresponding to the input string having the fast input intent.

Optionally, the first determination submodule includes: a first search subunit for, according to a preset shorthand rule, searching the complete word partly formed by the input string or an error correction string corresponding to the input string in the lexicon, to obtain the complete words corresponding to the input string having the fast input intent; or a second search subunit for, according to the input string and the corresponding context data, searching, in data of the language model, the complete word partly formed by the input string or an error correction string corresponding to the input string, to obtain the complete words corresponding to the input string having the fast input intent.

Optionally, the context data is adjacent or not adjacent to the input string.

Optionally, the candidate acquisition module includes: a segmentation submodule for segmenting the input string to obtain a plurality of substrings; a second determination submodule for determining lexical entries that conform to the fast input intent of each substring; a second model processing submodule for, inputting lexical entry combinations corresponding to the plurality of substrings into the language model, and outputting probabilities of the lexical entry combinations by using the language model, wherein lexical entry combinations are obtained from combinations of the lexical entries of all substrings; and a second selection submodule for, selecting the phrase candidates corresponding to the input string from the combinations of lexical entries according to the probabilities of the lexical entry combinations.

Optionally, the second determination submodule includes a mapping acquisition unit for, according to a preset mapping rule, obtaining a lexical entry for each substring.

Optionally, the preset mapping rule includes a pronunciation mapping rule. The mapping acquisition unit is further for mapping characters in the substring to corresponding alphabet characters according to the pronunciation mapping rule, to obtain the lexical entry corresponding to the substring.

In another aspect, the present application discloses an apparatus for input, which comprises a memory, and one or more programs. The one or more programs are stored in the memory and configured to execute the one or more programs includes commands for performing the following operations by one or more processors: receiving an input string having a fast input intent, which is used to indicate a word or a phrase according to the input string corresponding to a shorthand information of the word or the phrase; acquiring word candidates and/or phrase candidates corresponding to the input string according to a language model, wherein the word candidates and the phrase candidates are respectively complete words and complete phrases corresponding to the input string; and presenting the word candidates and/or the phrase candidates to a user.

The embodiments of the present application includes the following advantage. That is, the embodiment of the present application acquires a word candidate and/or a phrase candidate corresponding to the input string according to the language model. Since the above language model can obtain various probability parameters according to the corresponding data statistics of the language model, the embodiments of the present application can estimate the occurrence possibility of each word or each word sequence in the natural language by using the probability parameters of the language model, instead of by simply judging whether the word or the sequence of words conforms to the grammar. The embodiments of the present application can give word candidates that conform to the idiom of the corresponding data of the language model when a character located at any position in a word is omitted by the input string. Or, the phrase candidate that conforms to the idiom of the corresponding data of the language model may be given when a character located at any position in any word of a phrase is omitted by the input string. That is, the embodiments of the present application can not only improve the flexibility and the application range of the fast input, but also improve the quality of word candidates and/or phrase candidates, thereby improving input efficiency.

In the case where the word candidates or the phrase candidates conform to the idiom of the corresponding data of the language model, the word candidates and/or the phrase candidates presented on the top page can better conform to the user's fast input intent, so that the user completes the input of words or phrases with fewer keystroke operations, and improve input efficiency. Moreover, the candidate that conforms to the fast input intent can be selected without page turning, and the page turning operation can be saved, thereby effectively reducing the operation cost of the user and improving the input efficiency. For example, if the user wants to input the phrase "talk to you later", the traditional input method needs to input four words respectively, and the input of the four words requires 4, 2, 3, 5 keystrokes respectively with a total of 14 letter keystrokes, 4 times candidate confirmation keystrokes and 3 space keystrokes, for a total of 21 keystrokes. By applying the embodiments of the present application, the user can complete the input of the phrase "talk to you later" by inputting the string "ttyl", which requires 4 letter keystrokes and 1 candidate confirmation keystroke, for a total of 5 keystrokes, thereby greatly improving the input efficiency.

DETAILED DESCRIPTION

In order to make the above objects, features and advantages of the present disclosure more apparent, the present disclosure is further described in detail below with reference to the accompanying drawings and specific embodiments.

Method Embodiment 1

Figure 1:
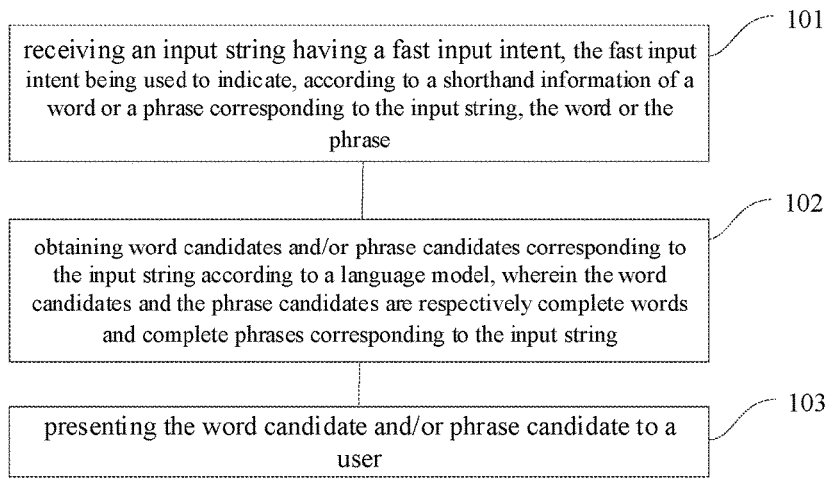
FIG. 1 illustrates a flowchart of an input method of the first embodiment consistent with the disclosed embodiments.

In the first method embodiment of the present application, FIG. 1 shows a flowchart of an input method, which may specifically include the following steps:

Step 101: receiving an input string having a fast input intent, the fast input intent being used to indicate, according to a shorthand information of a word or a phrase corresponding to the input string, the word or the phrase.

Step 102: obtaining word candidates and/or phrase candidates corresponding to the input string according to a language model, wherein the word candidates and the phrase candidates are respectively complete words and complete phrases corresponding to the input string.

Step 103: presenting the word candidate and/or the phrase candidate to a user.

The embodiment can be applied to the fast input of Latin alphabet languages such as English, Italian, Portuguese, and Malaysian, and can also be applied to the fast input of non-Latin alphabet languages such as Russian, so that the user implements fast input of words or phrases by input strings that represent shorthand information (e.g., abbreviated information) of words or phrases. Optionally, for the languages applicable to the embodiment, the input string and the word may be expressed in the same text form. That is, the word candidate having the same text form as the input string can be directly obtained without performing language conversion on the input string. For English, the input string can be expressed in letters, and English words can be expressed in alphabetical form. It can be understood that any language in which the input string is the same as the text form of the word is within the protection scope of the embodiment. The embodiment mainly describe the input process of English as an example, and the input process of other languages can be referred to each other.

The embodiment can be applied to input method programs of various input modes. For example, the foregoing input mode may specifically include an input method such as a keyboard symbol, a handwritten message, and a voice input. That is, a user can enter the input string by encoding a character string, handwriting input information, voice input information, and the like. In the following, only the input mode of the encoded character string (hereinafter referred to as the input string) is taken as an example, and other input modes can be referred to each other.

The input method provided by the embodiment can be applied to an application environment corresponding to a client and a server of an input method program. The client and the server of the input method program may be located in a wired or wireless network. The client and the server perform data interaction through the wired or wireless network. That is, the input method of the embodiment may be performed by any one of the client and the server. The embodiment does not limit the specific execution subject of each step in the input method.

Specifically, a client of the input method program can run on the intelligent terminal. The client can capture the user's input string during the input process. The intelligent terminal may specifically include, but is not limited to, a smart phone, a tablet computer, an e-book reader, a Moving Picture Experts Group Audio Layer III (MP3) player, and a Motion Picture Expert Group Audio Layer IV (MP4) player, a laptop, an on-board computer, a desktop computer, a set-top boxes, a smart TV, a wearable device, etc.

In practical applications, when a user has a fast input intent, a fast input of a word or a phrase can be realized by an input string corresponding to a shorthand information of the word or phrase.

Since the input string corresponds to the shorthand information of a word or phrase, the input string can be part of the word or phrase. For example, the characters contained in the input string are all characters contained in the word, but the number of characters contained in the input string is less than the number of characters contained in the word. The shorthand information that omits any characters contained in a word or phrase can be supported for processing. That is, the characters at any positions in the word (such as the front position, the middle position, the rear position, etc.) can be omitted, thereby improving the flexibility and application range of the fast input.

Alternatively, the input string can be mapped to the whole or part of the word or phrase. The input string may include a numeric character or an alphabetic character that has a mapping relationship with the pronunciation of the word. For example, 8/4 can be respectively used to map a whole or part of an English word that pronounced /eit/ and /fɔ:/. Or, for the Indonesian/Malay word "selamat", since "slmt" can determine its general pronunciation, it can be abbreviated with the input string "slmt". Other forms such as "selmt", "slmmat" can be used for corresponding shorthand information. The foregoing numeric characters having a mapping relationship with the pronunciation of a word enables inputting a word or a phrase with as few keystrokes as possible, thereby greatly improving input efficiency.

In an optional embodiment, the mapping relationship between the input string and the whole or part of the word or phrase may specifically include: homophonic, abbreviation mapping, and the like. The homophonic can map the whole or part of the word or phrase according to the pronunciation of the word or phrase, such as fore→4, eat→8, see→c, ticks→tix, your→ur, are→r, see→s and the like. Abbreviation mapping shorthand can be based on the general shorthand habits of the current language, or based on the user's personal habits. For example, the abbreviation mapping of the embodiment may include please→pls, tomorrow→tmr, by the way→btw, as soon as possible→ASAP, could you→cy and the like.

By means of two schemes of inputting a string (which is part of a word or a phrase, or which has a mapping relationship with a whole or a part of a word or a phrase), in terms of text form, the input string of the embodiment may include any one or combination of other characters such as letters, numbers, and the like. When the input string includes a letter, the letter can be located at any position of the word. For example, if the user wants to input the English word "before", he can input any letter contained in the English word such as "be" or "fo" or "bf", "rb", etc. It can be seen that the plurality of letters contained in the input string can be adjacent or not adjacent. Moreover, the order between the letters contained in the input string may be inconsistent with the order in the word. That is, since the input string of the embodiment of the present application can include letters located at any position of the word, the flexibility and application range of the fast input can be improved. When the order of the plurality of letters included in the input string may be inconsistent with the order in the word, the embodiment may use the context data of the input string to adjust the order of the plurality of letters included in the input string, and finally obtain a more reasonable word candidate.

When the input string includes a number, the number can be a numeric character that has a mapping relationship with the pronunciation of the word. For example, 8/4 can be respectively used to map a whole or part of an English word that pronounced /eit/ and /fɔ:/. Specifically, the whole word sounded as /eit/ may include "eight", and a segment pronounced /eit/ (such as a segment of the word "great") may include "eit". The whole word sounded as /fɔ:/ may include "for", "four", etc. A segment pronounced /fɔ:/ (such as a segment of the word "before") may include "fore", etc.

In practical applications, step 101 includes receiving an input string by receiving a keyboard symbol, a handwritten message, a voice input, or the like. Optionally, the received input string can be directly used as an input string having a fast input intent. That is, once the input method program receives an input string inputted by a user, the input string can be used as an input string with a fast input intent and applied to the input method of the embodiment. Or, it can be determined whether the received input string has a fast input intent. There are many ways to determine whether the received input string has a fast input intent. For example, it can be determined whether the input string is a complete word or phrase. If not, it can be determined that the received input string has a fast input intent. Another example is to determine whether non-alphabetic characters are included in the input string. If so, it can be determined that the received input string has a fast input intent. It can be understood that the does not limit the specific manner of judgment.

Step 102 includes obtaining a word candidate and/or a phrase candidate corresponding to the input string according to a language model. The language model described above can obtain various probability parameters according to the corresponding statistical data of the language model. In this way, the embodiment can estimate the occurrence possibility of each word or each word sequence in the natural language by means of the probability parameter of the language model, instead of simply determining whether the word or the word sequence conforms to the grammar. The embodiment can give a word candidate that conforms to the idiom of the corresponding data of the language model when a character located at any position in a word is omitted by the input string. Or, a phrase candidate that conforms to the idiom of the data corresponding to the language model may be given when a character located at any position in any word of a phrase is omitted by the input string. That is, the embodiment can process the input string with fast input intent more flexibly, and give a more reasonable word candidate or phrase candidate.

In the embodiment, the language model is an abstract mathematical modeling based on the objective facts of the language. The language model can establish a certain correspondence between the language model and the objective facts of the language. The embodiment mainly uses a statistical language model as an example, and the non-statistical language models can refer to each other.

Optionally, the statistical language model may describe the possibility that any word sequence S belongs to a certain language set in the form of a probability distribution. The word sequence S is not required to be grammatically complete herein. The statistical language model can give a probability parameter value to any word sequence S. The corresponding calculation formula can be expressed as:

$$p(S) = p(w_1, w_2, w_3, w_4, w_5, \ldots, w_n) \quad (1)$$
$$= p(w_1)p(w_2 | w_1)p(w_3 | w_1, w_2) \ldots p(w_n | w_1, w_2, \ldots, w_{n-1})$$

In formula (1), S includes n letters, and in formula (1), $w_i$ represents the ith word in the sequence of words. Optionally, the process of training the "language model" is the process of estimating the model parameters $P(w_i|w_{i-n+1}, \ldots, w_{i-1})$. $P(w_i|w_{i-n+1}, \ldots, w_{i-1})$ which represents the occurrence probability of the word $w_i$ when the previous n−1 words are $w_{i-n+1}, \ldots, w_{i-1}$.

According to the concept of the statistical language model, the existing statistical language model can process preset corpus based on a statistical algorithm to give the probability of word sequence. Or, in the case of given context data, predict the next most likely word.

In practical applications, an arbitrary statistical language model may be used to implement the input method of the embodiment. For example, the above statistical language model may specifically include a context-independent model, an N-gram model, a Hidden Markov Model, a Maximum Entropy Model, and a Recurrent Neural Network (RNN) Model. The context-independent model may be independent of the context. The N-gram grammar model, HMM model, maximum entropy model, RMM model, etc. need to depend on the context. N-gram grammar model, HMM model, maximum entropy model, and RMM model use different machine learning methods. The machine learning methods used by the HMM model, the maximum entropy model, and the RMM model not only consider the relationship between the preset corpus (i.e., the training text), but also use the timing characteristics of the training text. But the N-gram grammar model may ignore the connection between training texts.

In the embodiment, the preset corpus required for the statistical language model may be derived from an existing corpus. For the fast input of English, the existing corpus can include English corpus and the like. Or, the preset corpus required for the statistical language model can also be derived from famous books, Internet corpus, historical input records recorded by the input method program, and the like. It can be understood that any corpus is within the protection scope of the preset corpus in the embodiment.

In application example 1, a user wants to input the English word "before". Suppose that the user can input an input string corresponding to any letters contained in the English word, such as "be" or "fo" or "bf", "rb", etc., the embodiment can obtain the probability that the input string corresponds to the complete word according to the statistical language model, or obtain the probability that the input string corresponds to the complete word and its corresponding context data. Suppose that the contextual data is not considered, the statistical language model that does not depend on the context can give the probabilities of complete words containing the segment "fo". According to the magnitude of the probability, a reasonable word candidate corresponding to the input string can be given, such as "for", "before", and the like. In the process of inputting "The bus had left before I got there", the user wants to quickly input "before" by inputting the string "fo". Suppose that the context data before the input string includes "The bus had left", and the context data afterwards includes "I", the statistical language model that depends on the context can give the probability of the complete word containing the segment "fo" and the sequence of words corresponding to the context data. Finally, the word candidate "before" corresponding to the sequence of words with the highest probability is obtained.

In application example 2, a user wants to input the English phrase "what's happening now to Peter". Suppose that the user can input an input string omitting characters located at any positions of each word of the phrase, such as "whn2p", the embodiment can obtain the probabilities of the lexical entry combinations corresponding to the input string according to the statistical language model, and give the reasonable phrase candidates corresponding to the input string in the descending order of the probabilities, such as "what's happening now to Peter" and "we have nothing to present", and the like. In the process of obtaining the reasonable phrase candidates corresponding to the input string, the embodiment maps the character "P" to a person name. It can be understood that the above "Peter" is only an example of a person's name corresponding to the character "P". In fact, those skilled in the art can map the character "P" to a name other than "Peter" according to the practical application requirements, such as English name "Pavel", "Pinto", "pinto", "Pascal", or Chinese name. "Peijian" and the like. Optionally, the person's name with a higher frequency may be obtained from the historical input content of the current user, as the person's name corresponding to the character "P" or the like, to meet the personalized input requirement of the user. In addition, the user can also input the English phrase "what's happening now to Peter" through an input string other than "whn2p". For example, the input string other than "whn2p" can be "whntp" or the like.

In practical applications, the acquisition schemes of word candidates or phrase candidates may be mutually independent schemes. Moreover, if an input string can be interpreted as a word as well as a phrase, two candidates can be given at the same time for the user to select on demand. Whether the input string can be interpreted as a word or a phrase can be judged according to the probability of the word candidate or the phrase candidate. Optionally, if the probability that the input string corresponds to the word candidate or the phrase candidate is higher than the corresponding probability threshold, the input string can be considered as a word or a phrase.

In addition, after obtaining word candidates and/or phrase candidates, the input method program can present word candidates and/or phrase candidates to a user through the candidate window for the user to select. Optionally, word candidates and/or phrase candidates may be presented in any order. For example, a plurality of word candidates are first displayed and then a plurality of phrase candidates are presented, or one word candidate and one phrase candidate are presented alternately, or word candidates or phrase candidate s are displayed in descending order of the probabilities. It can be understood that the embodiment does not limit the specific manner of presentation.

In summary, the input method of the embodiment acquires word candidates and/or phrase candidates corresponding to the input string according to the language model. Since the foregoing language model can obtain various probability parameters according to the corresponding data statistics of the language model, the embodiment can estimate the occurrence possibility of each word or each word sequence in the natural language by means of the probability parameters of the language model, instead of simply determining whether the word or the sequence of words conforms to the grammar. The embodiments of the present application can give word candidates that conform to the idiom of the corresponding data of the language model when a character located at any position in a word is omitted by the input string. Or a phrase candidate that conforms to the idiom of the data corresponding to the language model may be given when a character located at any position in any word of a phrase is omitted by the input string. That is, the embodiment can not only improve the flexibility and application range of fast input, but also improve the quality of word candidates and/or phrase candidates, thereby improving input efficiency.

In the case that word candidates or phrase candidates conform to the idiomatic usage of the corresponding data of the language model, word candidates and/or phrase candidates presented on the first page can better conform to the user's fast input intent, so that the user selects a candidate that conforms to the fast input intent without page turning. Since the page turning operations can be saved, the operation cost of the user can be effectively reduced, and the input efficiency is improved.

Method Embodiment 2

The second method embodiment is an optional embodiment of the first method embodiment shown in FIG. 1. Based on the first embodiment of the method shown in FIG, the second method embodiment introduces the process of obtaining the word candidates corresponding to the input string according to the language model in detail.

In practical applications, a language model that does not depend on the context (such as a context-independent model) or a context-dependent language model (such as an N-gram grammar model) may be adopted to obtain word candidates corresponding to the input string. The language model that does not depend on the context has the advantage of simple operation. The language model that depends on the context can make word candidates more reasonable, that is, improve the quality of the word candidates.

Figure 2:
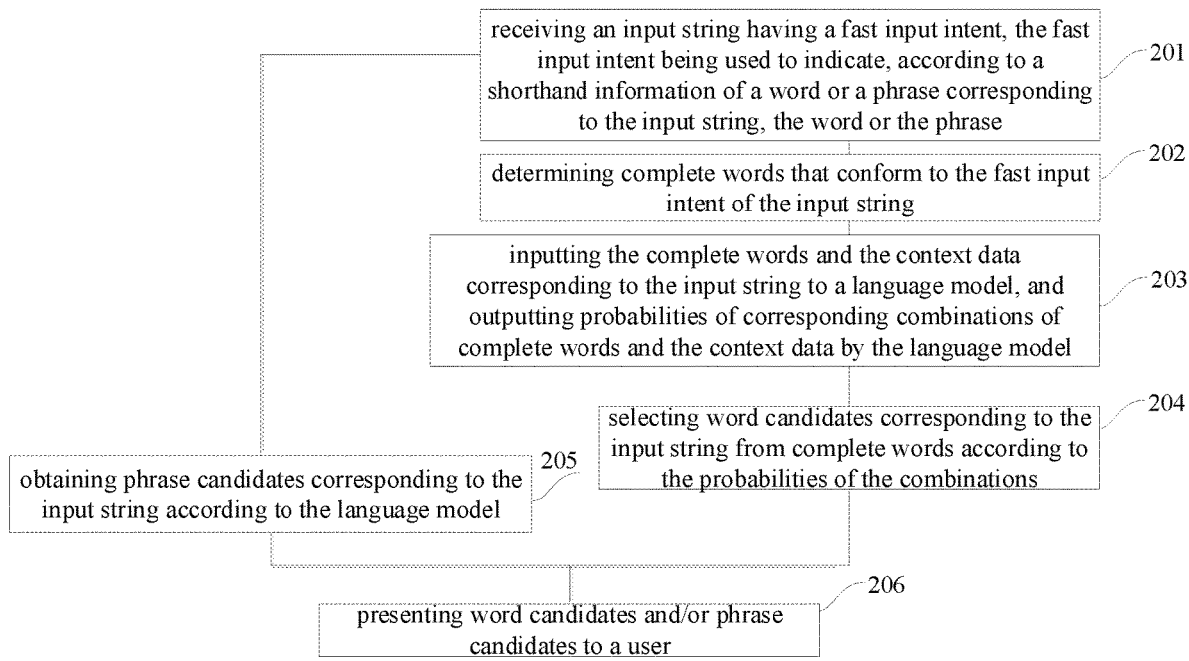
FIG. 2 illustrates a flowchart of an input method of the second embodiment consistent with the disclosed embodiments.

A flowchart of the input method of the second embodiment is shown in FIG. 2, which may specifically include the following steps:

Step 201: receiving an input string having a fast input intent, the fast input intent being used to indicate, according to a shorthand information of a word or a phrase corresponding to the input string, the word or the phrase;

Step 202: determining complete words that conform to the fast input intent of the input string;

Step 203: inputting the complete words and the context data corresponding to the input string to a language model, and outputting probabilities of corresponding combinations of complete words and the context data by the language model;

Step 204: selecting word candidates corresponding to the input string from complete words according to the probabilities of the combinations;

Step 205: obtaining phrase candidates corresponding to the input string according to the language model, wherein the word candidates and the phrase candidates are respectively complete words and complete phrases corresponding to the input string;

Step 206: presenting the word candidates and/or the phrase candidates to a user.

The embodiment introduces in detail the process of obtaining word candidates corresponding to an input string by a context model-dependent language model (such as an N-gram grammar model) through the above steps 202-204.

Since the input string corresponds to the shorthand information of a word or phrase, the input string can be part of the word or phrase, or have a mapping relationship with the whole or part of the word or phrase, so step 202 can determine complete words that conform to the fast input intent corresponding to the input string according to the scheme of the input string.

Optionally, the step 202 of determining the complete words that conform to the fast input intent corresponding to the input string, specifically includes:

Step A1: identifying a complete word partly formed by the input string or an error correction string corresponding to the input string as one of the complete words corresponding to the input string having the fast input intent;

Step A1 may be applied to the case where the input string is part of a word or a phrase. Specifically, part of the complete word may be the error correction string corresponding to the input string or the input string. Suppose that the input string corresponding to English is "fo", the complete word partly formed by "fo" may include "for", "before", and the like.

In an optional embodiment, the searching manner corresponding to the foregoing step A1 may specifically include: search manner 1 for, according to the preset shorthand/abbreviation rule, searching for complete words in the lexicon with the error correction string corresponding to the input string or the input string to obtain the complete words that conform to the fast input intent corresponding to the input string; or search manner 2 for, according to the input string and its corresponding context data, in the corresponding data of the language model, searching for complete word(s) partly formed by the input string or an error correction string corresponding to the input string, to obtain the complete word corresponding to the input string having the fast input intent; or search manner 3, according to segment(s) and preset vacancy-marking character string(s) included in the input string, search, in the lexicon, complete words partly formed by the segment, to obtain the complete word corresponding to the input string having the fast input intent, wherein the segment(s) are character(s) other than the preset vacancy-marking character string in the input string.

The search ranges of the search manner 1 and the search manner 2 are respectively the corresponding data of the lexicon and the language model. The search basis of the search manner 1 is the input string or the error correction string corresponding to the input string. The search basis of the search manner 2 is the input string and its corresponding context data.

Optionally, the preset shorthand rule may specifically include a prefix shorthand rule and a non-prefix shorthand rule. The non-prefix abbreviated rule may further include a vowel omission shorthand rule and an arbitrary letter omission shorthand rule, and the like. Since the consonant letters can determine the approximate pronunciation of a word, the vowel omission shorthand rule can accurately locate the word. For example, for the Indonesian/Malay word "selamat", since "slmt" can determine its approximate pronunciation, it can be abbreviated with the input string "slmt", of course, it can also be abbreviated with other forms such as "selmt", "slmat" and the like.

In practical applications, the search process of the search manner 1 may include: determining the position of each character of the input string in the complete word according to the preset shorthand rule, and then performing the complete word search according to the position. For example, for the prefix shorthand rule, the position of the input string in the complete word is the beginning. For the vowel omission shorthand rule, some character(s) in the input string are at the beginning of the complete word, some character(s) are at the end, and some character(s) are in the middle. For letter omitted shorthand rule, the characters in the input string can be located at any positions of the complete word. The order of the characters in the input string can be consistent or inconsistent with the order of the characters in the complete word.

In an optional embodiment, the search manner 1 may adopt a processing method similar to word spelling correction, and find one or more complete words in the lexicon that have the shortest edit distance between the input string and the lexical entries. The entry edit distance is the minimum number of edit operations required to switch from one to another between two strings. Allowed editing operations may include inserting, deleting, replacing, exchanging, and the like. In general, the smaller the edit distance, the greater the similarity between the two strings. The foregoing similar word spelling correction method can guarantee the rationality of the complete word to a certain extent.

It should be noted that the entries in the lexicon of the embodiment may be the existing entries, self-created entries, custom entries, or the like. The embodiment does not limit the specific lexicon and the specific terms.

According to the context data corresponding to the input string, the search manner 2 may search for the complete word of the given context data with the input string or the error correction string corresponding to the input string from corresponding data of the language model. For example, in the process of inputting "The bus had left before I got there", a user wants to quickly input "before" through the input string "fo". The above data of the input string "fo" includes "The bus had left" and the following data includes "I". The complete words "before", "for", and the like with the input string "fo" can be found in the corresponding data of the language model.

It should be noted that, in the embodiment, the error correction string corresponding to the input string may be obtained by correcting the input string under the assumption that the input string has errors. Optionally, an error correction scheme based on an edit distance scheme and/or a statistical-based error correction scheme may be adopted for error correction processing. The error correction scheme based on the edit distance can perform the following error correction attempts for each position of the input string: inserting a character, deleting a character, replacing a character, and exchanging the two character located at former and latter positions, and the like, to generate an error correction string corresponding to the input string. Through big data mining, the statistical-based error correction scheme can generate an error correction model which learns the probability that an error correction string is mistyped into an input string. It can be understood that the embodiment does not limit the specific error correction process of the input string.

Search manner 3 can mark a position with a preset character string. The preset character string may be any character string for marking the position that is preset by those skilled in the art or users according to practical application requirements. For example, "*", "?", "%", "#", and the like may also be characters that are inputted by a user and do not represent any meanings, such as "(", ">", and the like. It can be understood that the embodiment does not limit the specific preset character string.

In application example, a user wants to input the English word "phenomenon", but does not remember some of the characters. The preset character string can be adopted to mark a vacancy (i.e., a wild card). The input method program supplements the preset string. Suppose that the user's input string "phen*m*" includes two "*"s, the embodiment can supplement the two "*"s with character(s).

Optionally, the foregoing search manner 3 may match the segment in the input string with the entries in the lexicon according to the character position, to obtain the complete word corresponding to the input string. The position of the segment in the complete word is consistent with the position of the segment in the input string, so the search space can be reduced, and the search efficiency is improved.

It can be understood that the foregoing search manner 1, the search manner 2, and the search manner 3 are only an alternative embodiment for acquiring complete word(s) partly formed by the input string or an error correction string corresponding to the input string. In fact, the embodiment does not limit the specific acquisition process of the complete word partly formed by the input string or an error correction string corresponding to the input string.

Step A2: mapping characters in the input string to corresponding alphabetic characters according to pronunciations, to obtain complete words of the fast input intent corresponding to the input string.

In practical applications, the letters or numeric characters in the input string can be mapped to corresponding alphabetic characters according to the pronunciation of the word. For example, if the input string in English is "b4", you can map the numeric character "4" to the segment "fore" with the pronunciation /fɔ:/ and further look for the complete word "before" with "bfore". In another example, if the input string in Malaysian is "slmt", the Malay word "selamat" can be obtained by pronunciation mapping.

In application example 4, a user wants to input the Spanish word "afecta". The user can input a character string "afkt" that represents the approximate pronunciation of the Spanish word. The embodiment can use the pronunciation mapping of k→c to obtain the corresponding complete words "afecta", "afecto", "afectar", and the like. Similarly, the pronunciation mapping of ft→photo can also be used to get complete words. The English word "photograph" can be rapidly inputted by inputting the string "ftgrf".

After obtaining complete words that conforms to the fast input intent corresponding to the input string in the step 202, the step 203 may input complete words and the context data corresponding to the input string to a language model. The language model outputs the probability that the complete word and the context data are correspondingly combined. In practical applications, since the number of words contained in the word sequence involved in the language model is usually not too large. The number is usually 3. The target context data to be inputted to the language model can be selected from the context data. The target context data can be combined with the input string. The target context data can be adjacent or not adjacent to the input string.

For example, a user wants to quickly input the English word "blue" through the input string "bl", the above data of the input string "bl" includes: "the sky in the Friday morning is". According to the parsing result, the target context data "sky is" can be selected from the above data, thereby outputting a more reasonable word candidate "blue" from the language model. For another example, the user wants to quickly input the English word "French" through the input string "Fr". The above data of the input string "Fr" includes "he have lived in France for 5 years and he can speak fluent". The target context data "France speak" or the like can be selected from the above data according to the result of the statement analysis, whereby a more reasonable word candidate "French" can be outputted from the language model.

It should be noted that in practical applications, in the scenario where the user edits the input content, the input string may also have the context data following after the input string. In this case, the following context data of the input string can also be input to the language model. For example, if a user moves the cursor somewhere in the input content and retypes the input string, the data before and after the cursor can be acquired as context data at the same time.

In practical applications, step 204 may sort the complete words according to the probabilities of the combinations, and select the complete words in the top M rankings from the complete words in descending order as word candidates. M is a positive integer greater than or equal to 1. Alternatively, according to the probabilities of the combinations, complete words whose probabilities are larger than the probability threshold may be selected from the complete words as word candidates. It can be understood that the embodiment of the present application does not limit the specific selection process of word candidates.

In summary, the input method of the embodiment relies on the language model of the context (such as an N-gram grammar model) to obtain word candidates corresponding to the input string. The word candidates can be made more reasonable, that is, the quality and input efficiency of word candidates can be improved.

In the case where the quality of word candidates is high, word candidates presented on the top page can better conform to the user's fast input intent, so that the user can select candidates that conform to the fast input intent without page turning. Since the page turning operation can be saved, the operation cost of the user can be effectively reduced, and the input efficiency is improved.

Method Embodiment 3

The third method embodiment is an optional embodiment of the method embodiment 1 shown in FIG. 1 or the second embodiment of the method shown in FIG. 2. Based on the first method embodiment shown in FIG. 1 or the second method embodiment shown in FIG. 2, the process of obtaining the phrase candidate corresponding to the input string according to the language model is introduced in detail in the third method embodiment.

In practical applications, a language model that depends on the context (such as an N-gram grammar model) can be adopted to obtain phrase candidates corresponding to the input string, so that more reasonable phrase candidates can be found, that is, the quality of the phrase candidate can be improved.

Figure 3:
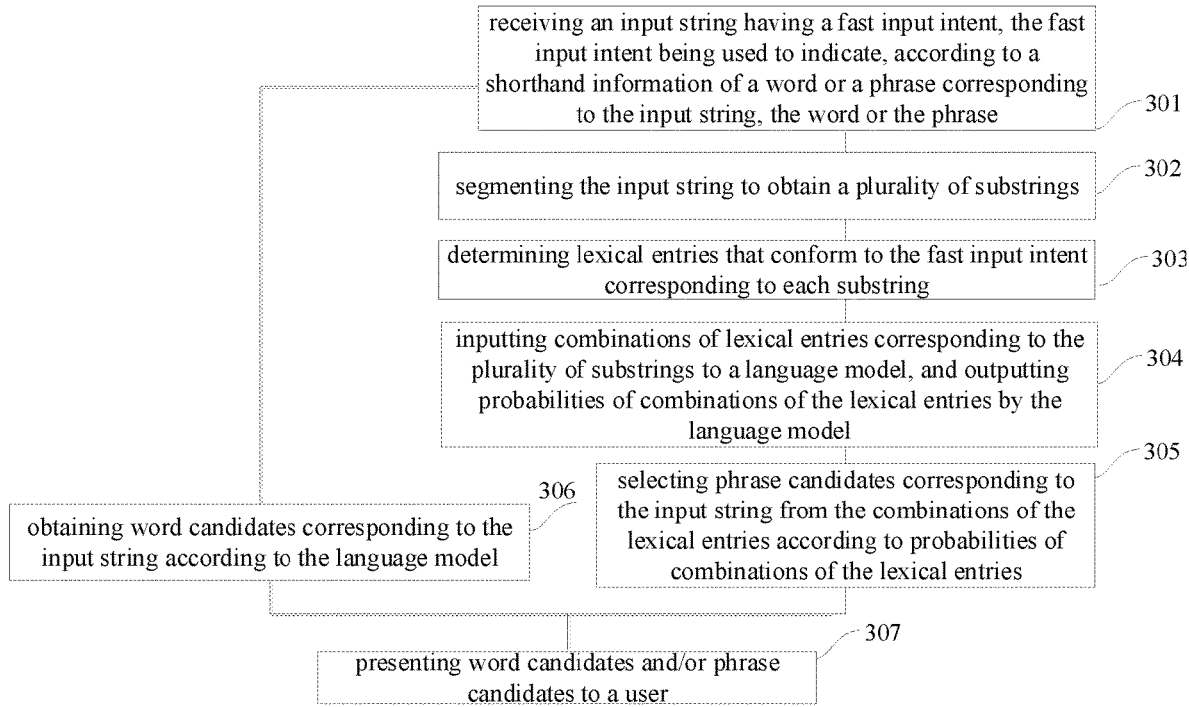
FIG. 3 illustrates a flowchart of an input method of the third embodiment consistent with the disclosed embodiments.

A flow chart of the input method of the third embodiment is shown in FIG. 3, which may specifically include the following steps:

Step 301: receiving an input string having a fast input intent, the fast input intent being used to indicate, according to a shorthand information of a word or a phrase corresponding to the input string, the word or the phrase;

Step 302: segmenting the input string to obtain a plurality of substrings;

Step 303: determining lexical entries that conform to the fast input intent corresponding to each substring;

Step 304: inputting lexical entry combinations corresponding to the plurality of substrings to a language model, and outputting probabilities of the lexical entry combinations by using the language model, wherein the lexical entry combinations are obtained according to combinations of the lexical entries of all substrings;

Step 305: selecting phrase candidates corresponding to the input string from the combinations of the lexical entries according to the probabilities of lexical entry combinations;

Step 306: obtaining word candidates corresponding to the input string according to the language model, wherein the word candidates and the phrase candidates are respectively complete words and complete phrases corresponding to the input string; and Step 307: presenting the word candidates and/or the phrase candidates to a user.

The substrings obtained by the step 302 can be used to represent independent words. In practical applications, the input string can have a plurality of segmentation schemes. For example, the input string can be segmented in the unit of characters. Each substring obtained by segmentation can have one or more characters. The input string "whn2p" is taken as an example. The input string "whn2p" can be divided into substrings such as "w", "h", "n", "2", and "p"

in unit of single character. Similarly, the input string "in2tix" can be divided into substrings such as "in", "2", and "tix". Alternatively, the input string "cu" can be divided into substrings such as "c" and "u". It can be understood that each segmentation scheme can have a corresponding segmentation result, so one input string can correspond to one or more segmentation results.

The lexical entry obtained in step 303 can represent the corresponding complete word when each substring is shorthand information of the word. Optionally, the step 303 of determining the lexical entries that conform to the fast input intent corresponding to each substring may specifically include: obtaining lexical entries corresponding to each substring according to the preset mapping rule, wherein the preset mapping rule can be a mapping rule corresponding to a word or a phrase.

Referring to Table 1, an illustration of various preset mapping rules of the present application is shown, which may specifically include mapping rule types and mapping rule examples. The mapping rule type may specifically include initial letter mapping, non-initial letter mapping, homophonic alphabet mapping, multi-letter mapping, digit mapping, custom mapping, and the like. Step 303 may map each substring to a corresponding lexical entry in Table 1. That is, each lexical entry of each substring corresponding to the fast input intent may be a word or a phrase.

TABLE 1

| Mapping rule type | Mapping example |
| --- | --- |
| Initial letter mapping | see→s, you→y |
| Non-initial letter mapping | you→u, are→r, of→f |
| Homophonic alphabet mapping | see→c, ticks→tix |
| Multi-letter mapping | your→ur, ticks→tix |
| Digit mapping | eit/eat→8, for/four/fore→4, to/too/tu→2 |
| Custom mapping | im→I am, im→I'm, am→I'm, cy→could you, ov→of, tml→tomorrow |

In an optional embodiment, the preset mapping rule may specifically include a pronunciation mapping rule. According to the preset mapping rule, the step of acquiring a lexical entry corresponding to each substring may specifically include mapping the characters in the substring to corresponding alphabetic characters according to the pronunciation mapping rule to obtain a lexical entry corresponding to the substring. The above pronunciation mapping rule may include homophone mapping or digital mapping in Table 1. The mapping of each substring can be performed according to the mapping relationship of the above homophonic letter mapping or digital mapping.

For a plurality of substrings corresponding to each segmentation result, the lexical entries can form at least one lexical entry combination. For example, multiple substrings "w", "h", "n", "2", "p" of the input string "whn2p" may form "what's happening now to Peter", "we have nothing to present", "we have No to park" and the like. It should be noted that the same or different preset mapping rules can be used for different substrings. One or more preset mapping rules can be used for one substring. The embodiment does not limit the specific use process of the preset mapping rule.

Step 304 may input combinations of lexical entries corresponding to the plurality of substrings to the language model, and output the probabilities of combinations of the lexical entries by the language model. Optionally, when the number of words included in the lexical entry of the substring is less than a quantity threshold (such as 3) corresponding to the language model, the lexical entry combination may also be inputted to the language model along with the corresponding context data, thereby improving the quality of phrase candidates.

Optionally, the language model can use a sliding window with n entries to see if there are associations between two or three or more lexical entries that are consecutive or non-consecutive. If yes, the association relationship may be marked on the path corresponding to the lexical entry combination. The probabilities of lexical entries are calculated according to all the association relationships on the complete path corresponding to the lexical entry combinations. It can be understood that the specific process of the language model calculating the probabilities of lexical entries is not limited in the embodiment.

In practical applications, step 305 can sort combinations of lexical entries according to the probabilities of lexical entry combinations, and select the top P lexical entry combinations from the lexical entry combinations in the descending order of probabilities as phrase candidates. P is a positive integer greater than or equal to 1. Alternatively, combinations of lexical entries whose probabilities are greater than a probability threshold may be selected from the lexical item combinations as phrase candidates according to probabilities of lexical entry combinations. It can be understood that the embodiment does not limit the specific selection process of phrase candidates.

It should be noted that the manners in which the input string is split in the embodiment are only optional embodiments. In fact, one character to one word without splitting the input string can be default.

In summary, the input method of the embodiment relies on a language model of the context (such as an N-gram grammar model) to obtain phrase candidates corresponding to the input string. Phrase candidates can be made more reasonable, that is, the quality and input efficiency of the phrase candidate can be improved.

In the case where the quality of the phrase candidate is high, phrase candidates displayed on the first page can better conform to the user's fast input intent, in order to enable the user to select candidates that conform to the fast input intent without page turning. Since the page turning operation can be saved, the operation cost of the user can be effectively reduced, and the input efficiency is improved.

It should be noted that, for the method embodiments, for the sake of simple description, the method embodiments are expressed as a series of motion action combinations. However, those skilled in the art should know that the embodiments are not limited by the described motion sequence, because some steps may be performed in other orders or simultaneously according to the embodiments. Secondly, those skilled in the art should also know that the embodiments described in the specification are all preferred embodiments, and the involved motions are not necessarily required in the embodiments.

Device Embodiment

Figure 4:
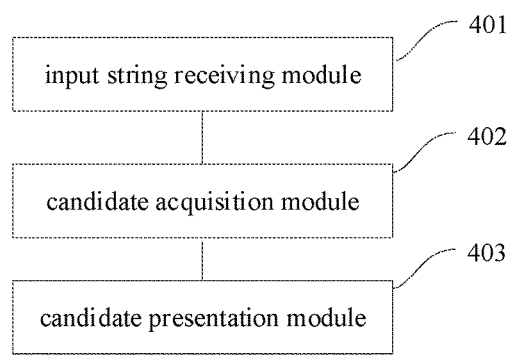
FIG. 4 illustrates a block diagram of an input device consistent with the disclosed embodiments.

Referring to FIG. 4, a structural diagram of an input device embodiment is shown, which may specifically include an input string receiving module 401, a candidate acquisition module 402, and a candidate presentation module 403.

The input string receiving module 401 is provided for receiving an input string having a fast input intent, the fast input intent being used to indicate, according to a shorthand information of a word or a phrase corresponding to the input string, the word or the phrase.

The candidate acquisition module 402 is provided for acquiring word candidates and/or phrase candidates corresponding to the input string according to a language model, wherein the word candidates and the phrase candidates are respectively complete words and complete phrases corresponding to the input string.

The candidate presentation module 403 is provided for presenting word candidates and/or phrase candidates to a user.

Optionally, the candidate obtaining module 402 may specifically include: a first determination submodule for determining complete words that conform to the fast input intent corresponding to the input string; a first model processing submodule for inputting context data corresponding to complete words and the input string to a language model, and outputting probabilities of corresponding combinations of complete words and the context data by the language model; a first selection submodule for selecting word candidates corresponding to the input string from complete words according to the probabilities of combinations.

Optionally, the first determination submodule may specifically include: a first determination unit for identifying a complete word partly formed by the input string or an error correction string corresponding to the input string as one of the complete words corresponding to the input string having the fast input intent; or a second determination unit for mapping characters in the input string to corresponding alphabetic characters according to pronunciations, to obtain one of the complete words corresponding to the input string having the fast input intent.

Optionally, the first determination unit may specifically include: a first search subunit for searching complete words in the lexicon with the error correction string corresponding to the input string or the input string, to obtain complete words of the fast input intent corresponding to the input string; or a second search subunit for searching, in the corresponding data of the language model, complete words with the error correction string corresponding to the input string or the input string according to the input string and the corresponding context data, to get complete words of the fast input intent corresponding to the input string.

Optionally, the context data is adjacent or not adjacent to the input string.

Optionally, the candidate acquisition module 402 may specifically include: a segmentation submodule for slicing the input string to obtain a plurality of corresponding substrings; a second determination submodule for determining the lexical entries of the fast input intent corresponding to each substring; a second model processing submodule for, inputting combinations of lexical entries corresponding to the plurality of substrings to a language model, and outputting by the language model, probabilities of combination of the lexical entries, wherein combinations of lexical entries are obtained from combinations of lexical entries of all substrings; a second selection submodule for selecting phrase candidates corresponding to the input string from combinations of lexical entries according to probabilities of combinations of the lexical entries.

Optionally, the second determination submodule may specifically include a mapping obtaining unit for obtaining lexical entries corresponding to each substring according to a preset mapping rule.

Optionally, the preset mapping rule may include a pronunciation mapping rule. The mapping obtaining unit specially maps characters in the substring to corresponding alphabetic characters according to the pronunciation mapping rule, to obtain lexical entries corresponding to the substring.

For the device embodiment, since it is basically similar to the method embodiment, the description is relatively simple, and the relevant parts can be referred to the description of the method embodiment.

Each embodiment in the present specification is described in a progressive manner, and each embodiment focuses on differences from other embodiments, and the same or similar parts between the various embodiments can be referred to each other.

With regard to the apparatus in the above embodiments, the specific manners in which the respective modules perform the operations are described in detail in the embodiments related to the methods, and are not explained in detail herein.

Figure 5:
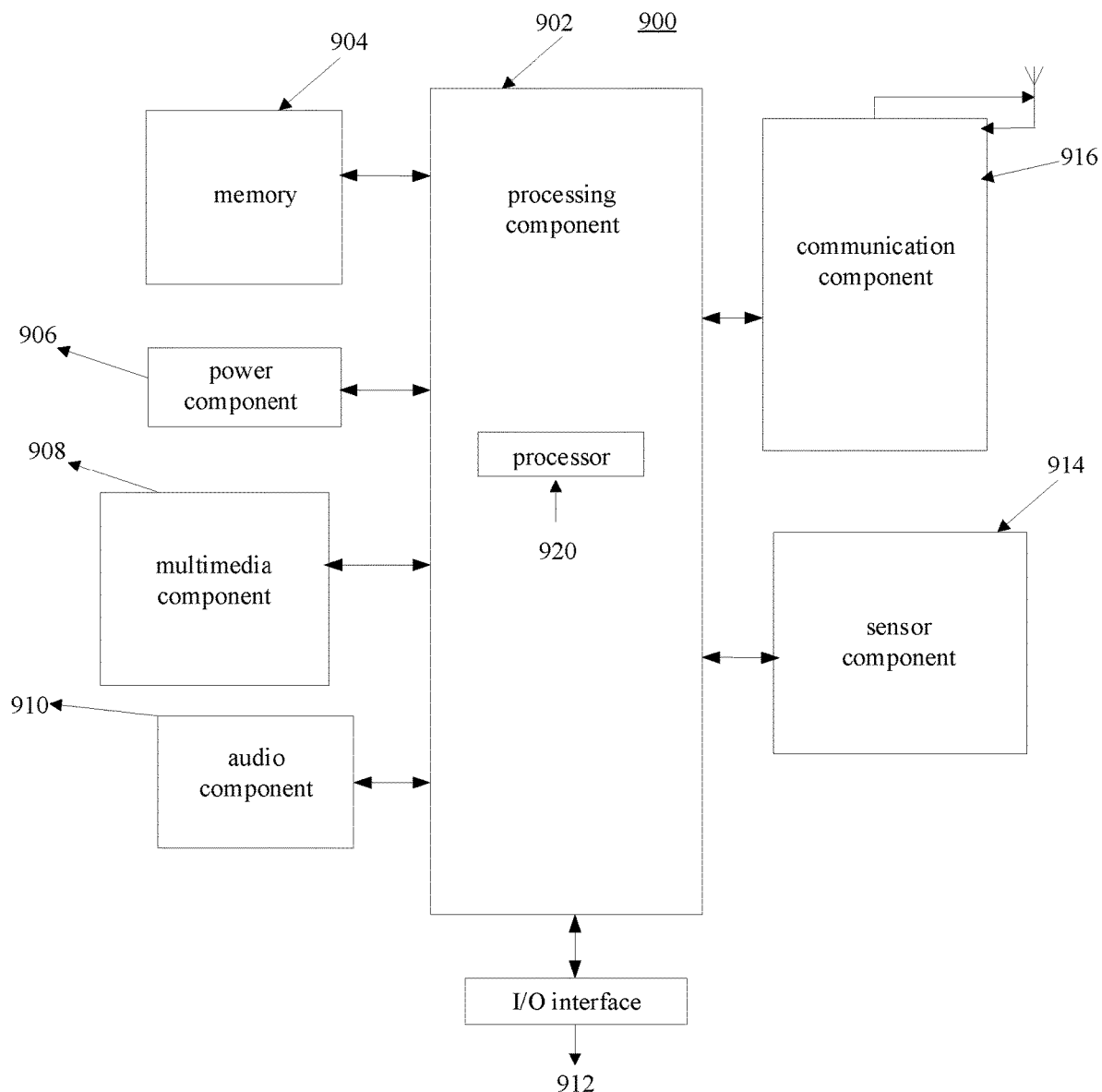
FIG. 5 illustrates a block diagram of an apparatus 900 for input consistent with the disclosed embodiments.

FIG. 5 is a block diagram of a device/apparatus 900 for input, according to an exemplary embodiment. For example, the device 900 can be a mobile phone, a computer, a digital broadcast terminal, a messaging device, a game console, a tablet device, a medical device, a fitness device, a personal digital assistant, or the like.

Referring to FIG. 5, the device 900 can include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the device 900, such as operations associated with display, telephone calls, data communications, camera operations, and recording operations. The processing component 902 can include one or more processors 920 to execute commands to perform all or part of the steps of the above methods. Moreover, the processing component 902 can include one or more modules to facilitate interaction between the component 902 and other components. For example, the processing component 902 can include a multimedia module to facilitate interaction between the multimedia component 908 and the processing component 902.

The memory 904 is provided for storing various types of data to support operations on the device 900. Examples of such data include commands for any applications or methods operated on the device 900, contact data, phone book data, messages, pictures, videos, and the like. The memory 904 can be implemented by any type of volatile or non-volatile storage device, or a combination thereof, such as a static random access memory (SRAM), an electrically erasable programmable read only memory (EEPROM), an Erasable Programmable Read Only Memory (EPROM), a Programmable Read-Only Memory (PROM), a Read Only Memory (ROM), a Magnetic Memory, a Flash memory, a disk or a disc.

The power component 906 provides power to various components of device 900. The power component 906 can include a power management system, one or more power sources, and other components associated with generating, managing, and distributing power for the device 900.

The multimedia component 908 includes a screen between the device 900 and the user that provides an output interface. In some embodiments, the screen may include a liquid crystal display (LCD) and a touch panel (TP). If the screen includes a touch panel, the screen can be implemented as a touch screen to receive input signals from users. The touch panel includes one or more touch sensors to sense touches, slides, and gestures on the touch panel. The touch sensor can sense not only the boundary of the touch or the sliding motion action, but also the duration and pressure associated with the touch or sliding operations. In some embodiments, the multimedia component 908 includes a front camera and/or a rear camera. The front camera and/or the rear camera can receive external multimedia data when the device 900 is in an operation mode, such as a shooting mode or a video mode. Each front and rear camera can be a fixed optical lens system or have focal length and optical zoom capability.

The audio component 910 is provided for outputting and/or inputting audio signals. For example, the audio component 910 includes a microphone (MIC). The microphone receives external audio signals when the device 900 is in an operational mode, such as a call mode, a recording mode, and a voice recognition mode. The received audio signals may be further stored in the memory 904 or sent by the communication component 916. In some embodiments, the audio component 910 also includes a speaker for outputting audio signals.

The I/O interface 912 provides an interface between processing component 902 and external interface modules. The above external interface modules can be keyboards, click wheels, buttons, and the like. The buttons may include, but are not limited to, home buttons, volume buttons, start buttons, and lock buttons.

The sensor component 914 includes one or more sensors for providing state assessment of various aspects of the device 900. For example, the sensor component 914 can detect an open/closed state of the device 900, relative positioning of components. For example, the sensor component 914 is a display and keypad of device 900. The sensor component 914 can also detect a change in position of device 900 or a component of device 900, the presence or absence of contact by a user with the device 900, the orientation or acceleration/deceleration of the device 900, and the temperature variation of the device 900. The sensor assembly 914 can include a proximity sensor for detecting the presence of nearby objects without any physical contact. The sensor component 914 can also include a light sensor, such as a complementary metal oxide semiconductor (CMOS) or a charge-coupled device (CCD) image sensor for use in imaging applications. In some embodiments, the sensor component 914 can also include an acceleration sensor, a gyro sensor, a magnetic sensor, a pressure sensor, or a temperature sensor.

The communication component 916 facilitates wired or wireless communication between device 900 and other devices. The device 900 can access a wireless network based on communication standards, such as WiFi, 2G or 3G, or a combination thereof. In an exemplary embodiment, the communication component 916 receives a broadcast signal or broadcast associated information from an external broadcast management system via a broadcast channel. In an exemplary embodiment, the communication component 916 further includes a Near Field Communication (NFC) module to facilitate short-range communication. For example, the NFC module can be implemented based on the Radio Frequency Identification (RFID) technology, the Infrared Data Association (IrDA) technology, the Ultra-Wideband (UWB) technology, the Bluetooth (BT) technology and other technologies.

In an exemplary embodiment, the device 900 may be implemented by one or more Application Specific Integrated Circuits (ASICs), a Digital Signal Processor (DSP), a Digital Signal Processing Device (DSPD), and a programmable Logic Device (PLD), a Field-Programmable Gate Array (FPGA), a controller, microcontroller, a microprocessor or other electronic components for performing the above methods.

In an exemplary embodiment, a non-transitory computer readable storage medium comprising commands is provided, such as the memory 904 comprising commands. The above commands may be executed by the processor 920 of the device 900 to perform the above method. For example, the non-transitory computer readable storage medium may be a ROM, a random access memory (RAM), a CD-ROM, a magnetic tape, a floppy disk, and an optical data storage device.

A non-transitory computer readable storage medium, enables an intelligent terminal to perform an input method when commands in the storage medium are executed by a processor of the intelligent terminal. The input method includes: receiving an input string having a fast input intent which is used to indicate a word or a phrase according to the input string corresponding to a shorthand information of the word or the phrase; obtaining word candidates and/or phrase candidates corresponding to the input string according to a language model, wherein the word candidates and the phrase candidates are respectively complete words and complete phrases corresponding to the input string; and presenting word candidates and/or phrase candidates to a user.

Figure 6:
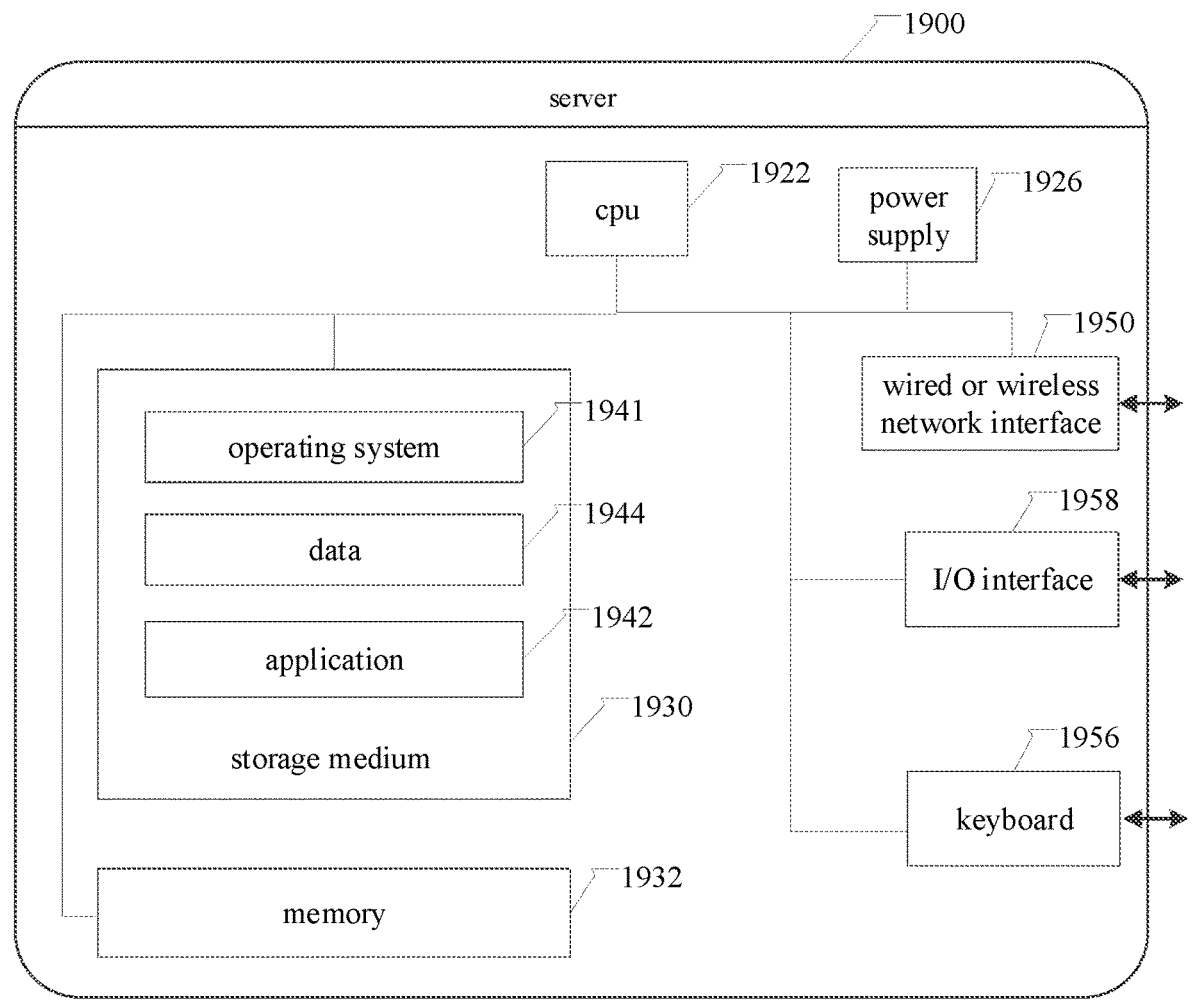
FIG. 6 illustrates a structural diagram of a server consistent with some of the disclosed embodiments.

FIG. 6 is a structural diagram of a server in some embodiments. The server 1900 can vary considerably depending on configuration or performance, and can include one or more central processing units (CPUs) 1922, a memory 1932, one or more storage medium 1930 (such as one or more mass storage device) storing the application 1942 or data 1944. The memory 1932 and the storage medium 1930 may be short-term storage or persistent storage. The program stored in the storage medium 1930 may include one or more modules (not shown in FIG. 6), each of which may include a series of command operations on the server. Further, the central processor 1922 can communicate with storage medium 1930, execute a series of instruction operations in storage medium 1930 on server 1900.

Server 1900 may also include one or more power supplies 1926, one or more wired or wireless network interfaces 1950, one or more input and output interfaces 1958, one or more keyboards 1956, and/or one or more operating systems 1941, such as Windows Server™, Mac OS X™, Unix™, Linux™, FreeBSD™, and the like.

Figure 7:
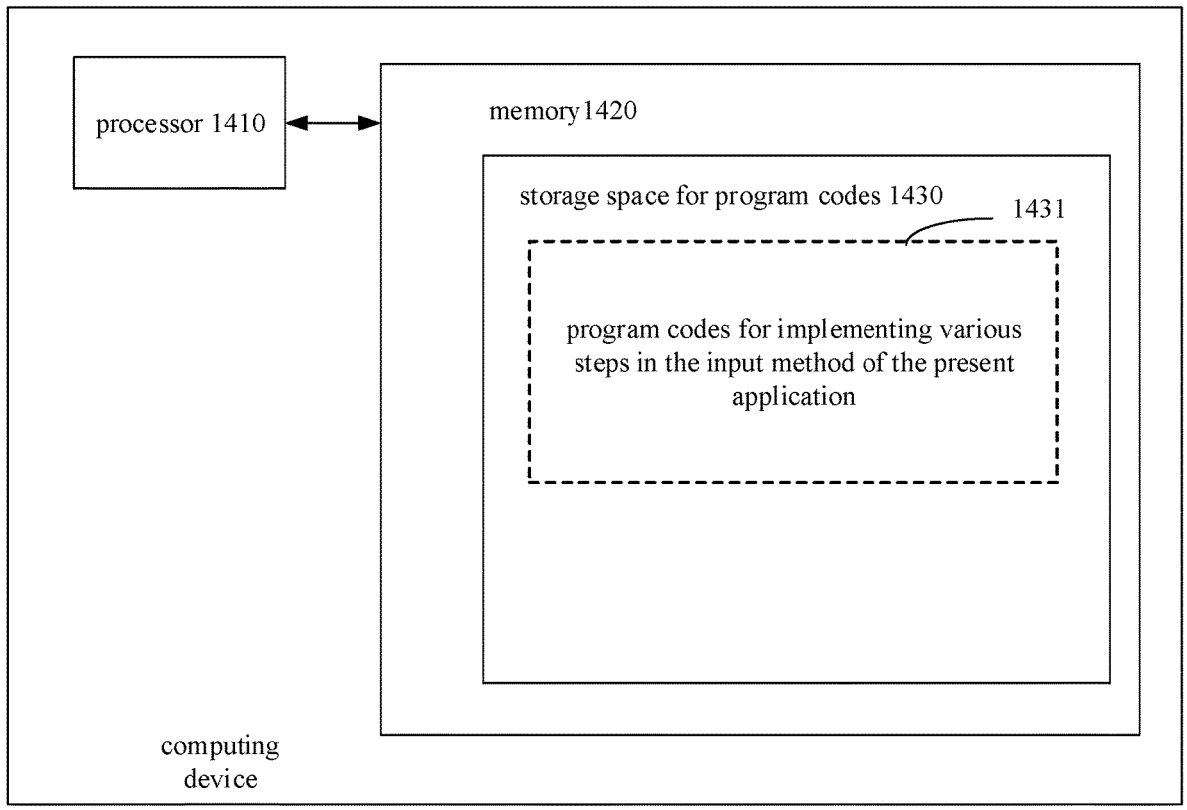
FIG. 7 illustrates a block diagram of a computing device for performing an input method consistent with the disclosed embodiments.
Figure 8:
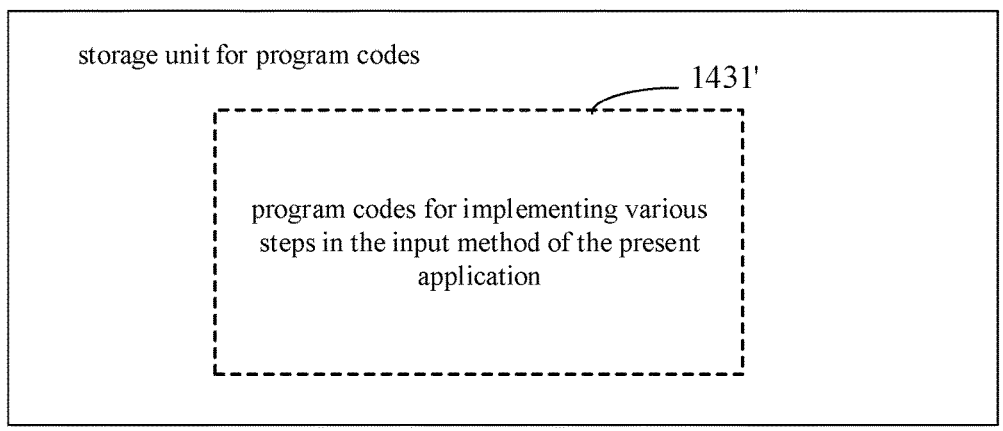
FIG. 8 illustrates a storage unit for holding or carrying a program code implementing the input method consistent with the disclosed embodiments.

FIG. 7 shows a computing device for performing input methods according to the present application. The computing device conventionally includes a processor 1410 and a program product or readable medium in the form of a memory 1420. The memory 1420 may be an electronic memory such as a flash memory, an EEPROM (Electrically Erasable Programmable Read Only Memory), an EPROM, or a ROM. The memory 1420 has a storage space 1430 for executing program code 1431 of any of the above method steps. For example, the storage space 1430 for program codes may include respective program codes 1431 for implementing various steps in the above methods respectively. The program codes can be read from or written to one or more program products. The program products include program code carriers such as memory cards and the like. Such a program product is typically a portable or fixed storage unit as described with reference to FIG. 8. The storage unit may have storage segments, storage spaces, and the like that are similarly arranged to memory 1420 in the computing device of FIG. 7. The program code can be compressed in an appropriate form. Typically, the storage unit includes the readable code 1431, which can be read by a processor such as 1410. When executed by a computing device, the codes cause the computing device to perform various steps in the methods described above.

Other embodiments of the present application will be readily thought by those skilled in the art after considering the specification and practicing the embodiments disclosed herein. The application is intended to cover any variations, uses, or adaptations of the present application, which are subject to the general principles of the present application and include common general knowledge or conventional technical means in the art that are not disclosed in the present disclosure. The specification and embodiments are regarded as illustrative only. The scope and spirit of the application are pointed out by the following claims.

It should be understood that the present application is not limited to the precise structures that have been described above and illustrated in the accompanying drawings. Various modifications and changes of the present application without departing from the scope thereof can be made. The scope of the application is limited only by the appended claims.

The above are only the preferred embodiments of the present application, and are not intended to limit the present application. Any modifications, equivalent substitutions, improvements, and the like made within the spirit and principles of the present application are included in the protection scope of the present application.

An input method, an input device and an apparatus for input provided by the present application are described above in detail. Specific examples are applied to describe the principles and implementations of the present application. The description of the above embodiments is only for helping understand the methods and core ideas of the present application. For those skilled in the art, according to the idea of the present application, there are variations in the specific implementation manners and application scope. In summary, the content of the present specification should not be understood as limiting the present application.

What is claimed is:

1. An input method, comprising:
    training a language model using a machine learning method, the language model including a pronunciation mapping rule, wherein:
        the pronunciation mapping rule maps a phrase "talk to you later" with an input string of "ttyl";
        the pronunciation mapping rule maps a whole or part of an English word with an input string of number "8" or an input string of number "4";
        the pronunciation mapping rule maps a phrase "what's happening now to Peter" or a phrase "we have nothing to present" with an input string of "whn2p" or an input string of "whntp"; and
        the pronunciation mapping rule maps a word "afecta," a word "afecto," or a word "afectar" with an input string of "afkt";
    receiving an input string having a fast input intent, wherein the fast input intent is used to indicate, according to shorthand information of a word corresponding to the input string, the word, and wherein:
        the input string includes a character that is positioned at a middle position or a rear position of the word but not at a front position of the word;
        two adjacent characters of the input string are two non-adjacent characters in the word; or
        two characters of the input string are present in reverse order in the word;
    using the pronunciation mapping rule of the language model to map characters in the input string to corresponding alphabet characters and to obtain one of complete words or one of complete phrases corresponding to the input string having the fast input intent;
    inputting into the language model context data before the input string and context data after the input string, comprising: when a cursor is moved by a user to edit the input string, acquiring data before and after the cursor as the context data before the input string and the context data after the input string to be inputted into the language model;
    acquiring word candidates corresponding to the input string according to the language model;
    acquiring, by using the language model, phrase candidates corresponding to the input string, wherein the word candidates and the phrase candidates are respectively complete words and complete phrases corresponding to the input string; and
    presenting the word candidates and the phrase candidates to the user, wherein acquiring, by using the language model, the phrase candidates corresponding to the input string comprises:
    segmenting the input string to obtain a plurality of substrings;
    determining lexical entries that conform to the fast input intent of each sub string;
    inputting lexical entry combinations corresponding to the plurality of substrings into the language model, and outputting probabilities of the lexical entry combinations by using the language model, wherein lexical entry combinations are obtained from combinations of the lexical entries of all the substrings; and
    selecting the phrase candidates corresponding to the input string from the combinations of lexical entries according to the probabilities of the lexical entry combinations.

2. The method according to claim 1, further comprising: identifying a complete word partly formed by the input string or an error correction string corresponding to the input string as one of the complete words corresponding to the input string having the fast input intent.

3. The method according to claim 2, wherein identifying a complete word partly formed by the input string or an error correction string corresponding to the input string as one of the complete words corresponding to the input string having the fast input intent comprises:
    according to a preset shorthand rule, searching the complete word partly formed by the input string or an error correction string corresponding to the input string in the lexicon, to obtain one of the complete words corresponding to the input string having the fast input intent; or
    searching, in data of the language model, the complete word partly formed by the input string or an error correction string corresponding to the input string according to the input string and the corresponding context data, so as to obtain one of the complete words corresponding to the input string having the fast input intent; or
    according to a segment and a preset vacancy-marking character string included in the input string, searching the complete words partly formed by the segment in the lexicon, to obtain one of the complete words corresponding to the input string having the fast input intent, wherein the segment is formed by characters other than the preset character string in the input string.

4. The method according to claim 1, wherein the context data is adjacent or not adjacent with said input string.

5. The method according to claim 1, wherein determining lexical entries that conform to the fast input intent corresponding to each substring comprises:
obtaining a lexical entry for each substring according to a preset mapping rule, the preset mapping rule includes the pronunciation mapping rule.

6. The method according to claim 1, wherein the language model rule includes an error correction scheme, and the method further comprises:
supplementing the input string, according to the error correction scheme of the language model, with a symbol "*" to indicate one or more letters of an English word.

7. The method according to claim 1,
wherein the whole or part of the English word that is mapped with the input string of number "8" or the input string of number "4" pronounces /eit/ or /fɔ:/; or
wherein the whole or part of the English word that is mapped with the input string of number "8" or the input string of number "4" includes a "fore," "for," "four," or "eat."

8. An apparatus for input, comprising a memory, and one or more programs, wherein one or more programs are stored in the memory, and execute, by one or more processors, the one or more programs contain commands for performing:
training a language model using a machine learning method, the language model including a pronunciation mapping rule, wherein:
the pronunciation mapping rule maps a phrase "talk to you later" with an input string of "ttyl";
the pronunciation mapping rule maps a whole or part of an English word with an input string of number "8" or an input string of number "4";
the pronunciation mapping rule maps a phrase "what's happening now to Peter" or a phrase "we have nothing to present" with an input string of "whn2p" or an input string of "whntp"; and
the pronunciation mapping rule maps a word "afecta," a word "afecto," or a word "afectar" with an input string of "afkt";
receiving an input string having a fast input intent, which is used to indicate a word according to the input string corresponding to shorthand information of the word, and wherein:
the input string includes a character that is positioned at a middle position or a rear position of the word but not at a front position of the word;
two adjacent characters of the input string are two non-adjacent characters in the word; or
two characters of the input string are present in reverse order in the word;
using the pronunciation mapping rule of the language model to map characters in the input string to corresponding alphabet characters and to obtain one of complete words or one of complete phrases corresponding to the input string having the fast input intent;
inputting into the language model context data before the input string and context data after the input string, comprising: when a cursor is moved by a user to edit the input string, acquiring data before and after the cursor as the context data before the input string and the context data after the input string to be inputted into the language model;
acquiring word candidates corresponding to the input string according to the language model;
acquiring, by using the language model, phrase candidates corresponding to the input string, wherein the word candidates and the phrase candidates are respectively complete words and complete phrases corresponding to the input string; and
presenting the word candidate and the phrase candidate to the user wherein acquiring, by using the language model, the phrase candidates corresponding to the input string comprises:
segmenting the input string to obtain a plurality of substrings;
determining lexical entries that conform to the fast input intent of each sub string;
inputting lexical entry combinations corresponding to the plurality of substrings into the language model, and outputting probabilities of the lexical entry combinations by using the language model, wherein lexical entry combinations are obtained from combinations of the lexical entries of all the substrings; and
selecting the phrase candidates corresponding to the input string from the combinations of lexical entries according to the probabilities of the lexical entry combinations.

9. The apparatus according to claim 8, wherein the one or more processors execute the one or more programs to further perform:
identifying a complete word partly formed by the input string or an error correction string corresponding to the input string as one of the complete words corresponding to the input string having the fast input intent.

10. The apparatus according to claim 9, wherein identifying a complete word partly formed by the input string or an error correction string corresponding to the input string as one of the complete words corresponding to the input string having the fast input intent comprises:
according to a preset shorthand rule, searching the complete word partly formed by the input string or an error correction string corresponding to the input string in the lexicon, to obtain one of the complete words corresponding to the input string having the fast input intent; or
searching, in data of the language model, the complete word partly formed by the input string or an error correction string corresponding to the input string according to the input string and the corresponding context data, so as to obtain one of the complete words corresponding to the input string having the fast input intent; or
according to a segment and a preset vacancy-marking character string included in the input string, searching the complete words partly formed by the segment in the lexicon, to obtain one of the complete words corresponding to the input string having the fast input intent, wherein the segment is formed by characters other than the preset character string in the input string.

11. The apparatus according to claim 8, wherein the context data is adjacent or not adjacent with said input string.

12. The apparatus according to claim 8, wherein determining lexical entries that conform to the fast input intent corresponding to each substring comprises:
obtaining a lexical entry for each substring according to a preset mapping rule, the preset mapping rule includes the pronunciation mapping rule.

13. A non-transitory storage medium storing computer-readable instructions that, when being executable by at least one processor, cause the at least one processor to perform:

training a language model using a machine learning method, the language model including a pronunciation mapping rule, wherein:
- the pronunciation mapping rule maps a phrase "talk to you later" with an input string of "ttyl";
- the pronunciation mapping rule maps a whole or part of an English word with an input string of number "8" or an input string of number "4";
- the pronunciation mapping rule maps a phrase "what's happening now to Peter" or a phrase "we have nothing to present" with an input string of "whn2p" or an input string of "whntp"; and
- the pronunciation mapping rule maps a word "afecta," a word "afecto," or a word "afectar" with an input string of "afkt";

receiving an input string having a fast input intent, wherein the fast input intent is used to indicate, according to shorthand information of a word corresponding to the input string, the word, and wherein:
- the input string includes a character that is positioned at a middle position or a rear position of the word but not at a front position of the word;
- two adjacent characters of the input string are two non-adjacent characters in the word; or
- two characters of the input string are present in reverse order in the word;

using the pronunciation mapping rule of the language model to map characters in the input string to corresponding alphabet characters and to obtain one of complete words or one of complete phrases corresponding to the input string having the fast input intent;

inputting into the language model context data before the input string and context data after the input string, comprising: when a cursor is moved by a user to edit the input string, acquiring data before and after the cursor as the context data before the input string and the context data after the input string to be inputted into the language model;

acquiring word candidates corresponding to the input string according to the language model;

acquiring, by using the language model, phrase candidates corresponding to the input string, wherein the word candidates and the phrase candidates are respectively complete words and complete phrases corresponding to the input string; and presenting the word candidates and the phrase candidates to the user, wherein acquiring, by using the language model, phrase candidates corresponding to the input string comprises:

segmenting the input string to obtain a plurality of substrings;

determining lexical entries that conform to the fast input intent of each sub string;

inputting lexical entry combinations corresponding to the plurality of substrings into the language model, and outputting probabilities of the lexical entry combinations by using the language model, wherein lexical entry combinations are obtained from combinations of the lexical entries of all the substrings; and selecting the phrase candidates corresponding to the input string from the combinations of lexical entries according to the probabilities of the lexical entry combinations.

14. The storage medium according to claim 13, wherein the computer-readable instructions cause the at least one processor to further perform:
identifying a complete word partly formed by the input string or an error correction string corresponding to the input string as one of the complete words corresponding to the input string having the fast input intent.

15. The storage medium according to claim 14, wherein identifying a complete word partly formed by the input string or an error correction string corresponding to the input string as one of the complete words corresponding to the input string having the fast input intent comprises:
- according to a preset shorthand rule, searching the complete word partly formed by the input string or an error correction string corresponding to the input string in the lexicon, to obtain one of the complete words corresponding to the input string having the fast input intent; or
- searching, in data of the language model, the complete word partly formed by the input string or an error correction string corresponding to the input string according to the input string and the corresponding context data, so as to obtain one of the complete words corresponding to the input string having the fast input intent; or
- according to a segment and a preset vacancy-marking character string included in the input string, searching the complete words partly formed by the segment in the lexicon, to obtain one of the complete words corresponding to the input string having the fast input intent, wherein the segment is formed by characters other than the preset character string in the input string.

* * * * *